US012486482B2

(12) United States Patent
Vanek

(10) Patent No.: US 12,486,482 B2
(45) Date of Patent: Dec. 2, 2025

(54) WOODEN CASK FOR STORING AND AGING WINE AND OTHER BEVERAGES

(71) Applicants: Tomas Nejedlik, Velke Losiny (CZ); Ernst Franz Alt, Ilanz (CH)

(72) Inventor: Ladislav Vanek, Blansko Klepacov (CZ)

(73) Assignees: Tomas Nejedlik, Velke Losiny (CZ); Ernst Alt, Hanz (CH)

( * ) Notice: Subject to any disclaimer, the term of this patent is extended or adjusted under 35 U.S.C. 154(b) by 254 days.

(21) Appl. No.: 18/247,069

(22) PCT Filed: Sep. 29, 2020

(86) PCT No.: PCT/CZ2020/050071
§ 371 (c)(1),
(2) Date: Mar. 28, 2023

(87) PCT Pub. No.: WO2022/037728
PCT Pub. Date: Feb. 24, 2022

(65) Prior Publication Data

US 2023/0373682 A1 Nov. 23, 2023

(51) Int. Cl.

| | |
|---|---|
| ***C12H 1/22*** | (2006.01) |
| ***B65D 6/00*** | (2006.01) |
| ***B65D 6/34*** | (2006.01) |
| *B65D 8/00* | (2006.01) |

(52) U.S. Cl.
CPC ................. *C12H 1/22* (2013.01); *B65D 9/34* (2013.01); *B65D 9/04* (2013.01)

(58) Field of Classification Search
CPC ... C12H 1/22; B65D 9/06; B65D 9/34; B65D 9/12; B65D 9/04
USPC ............................................. 99/277.1, 277.2
See application file for complete search history.

(56) References Cited

U.S. PATENT DOCUMENTS

| | | | | | |
|---|---|---|---|---|---|
| 1,427,907 | A * | 9/1922 | Payne | B65D 9/32 217/80 |
| 2,014,543 | A * | 9/1935 | Whiton | B65D 9/12 217/12 R |
| 3,106,885 | A * | 10/1963 | Kelley | C12H 1/22 99/277.1 |

(Continued)

FOREIGN PATENT DOCUMENTS

| | | | | |
|---|---|---|---|---|
| FR | 2734551 A1 * | 11/1996 | B65D 25/38 |
| WO | WO-9845192 A1 * | 10/1998 | B65D 88/10 |

*Primary Examiner* — Reginald Alexander
(74) *Attorney, Agent, or Firm* — Muncy, Geissler, Olds & Lowe, P.C.

(57) ABSTRACT

A wooden cask for storing and aging wine. The cask may comprise a top panel, a bottom panel, a front panel, a rear panel and two side panels assembled together to define an internal storage volume. The cask may further comprise at least two associated pairs of vertical beams forming a buttress against external faces of two opposite side panels, and at least two compression rods per an associated pair of vertical beams. The compression rods may exert a horizontal force tending to bring together opposite vertical beams of a pair of associated vertical beams and opposite side panels against which these two vertical beams rest. The compression rods may pass at a distance above a surface of the top panel along an external face thereof or below the bottom panel in the vicinity of lower edges of at least one of the front, rear, and side panels.

18 Claims, 7 Drawing Sheets

(56) References Cited

U.S. PATENT DOCUMENTS

| | | | | | |
|---|---|---|---|---|---|
| 4,093,099 | A * | 6/1978 | Spooner | B65D 9/12 217/65 |
| 4,324,172 | A * | 4/1982 | Cazals | B65D 19/12 99/277.1 |
| 2019/0061994 | A1 * | 2/2019 | Savioz | B65D 9/12 |

* cited by examiner

WOODEN CASK FOR STORING AND AGING WINE AND OTHER BEVERAGES

FIELD OF THE INVENTION

This invention relates to a structure of a wooden cask of polyhedral shape for storing and aging beverages, in particular wine and spirits.

BACKGROUND OF THE INVENTION

In the prior art, wooden casks or containers or barrels in the shape of a polyhedron (e.g. with six walls) for storing and aging beverages are known as an alternative to cylindrical barrels. The advantage of these multi-walled barrels is better spatial storage and better use of internal storage volumes.

The international patent application WO 9845192 A1 describes a wooden cask in the shape of a polyhedron for storing and aging beverages, which comprises a top, bottom, front, rear and two side panels assembled together to define an internal storage volume. There is a fill hole in the top panel near the front edge thereof and a drain hole in the front panel near the lower edge thereof, not contacting the internal face of the bottom panel. Thus, there is a space between the drain hole and the internal face of the bottom panel from which not all liquid can drain. The bottom panel is inclined downwards from the rear edge toward the front edge and the top panel is inclined upwards from the rear edge toward the front edge, with a roof-like depression in front of the inner side of the top panel from the central front-rear axis of the top panel to the side edges thereof for reducing the volume of residual air near the fill hole.

On the outer sides of the two opposite side panels, two combined pairs of vertical beams are arranged and functioning as buttresses, the ends of which do not extend beyond the lower or upper edge of the side panels. Each vertical beam is connected to another vertical beam positioned opposite the external face of the opposite side panel by a pair of compression rods, each compression rod connecting two opposite ends in a pair of associated vertical beams, thereby being able to exert a horizontal force tending to bring the opposite side panels together. Each end of the vertical beams is pierced with a horizontal through hole, and each side panel is pierced with a plurality of horizontal through holes, each being aligned with the adjacent horizontal through hole of the vertical beam, and the compression rods pass through the adjacent horizontal through holes. The compression rods extend over the top panel or below the bottom panel along their outer sides, and each compression rod is additionally sunk between the opposite side panels into a horizontal groove of a horizontal beam which is connected to the top or bottom panel by a dovetail joint. As a result, the compression rods are also in contact with the top, or bottom panels and also bring them together. In addition, each compression rod comprises two threaded ends to which a fixing nut is screwed.

The individual panels are connected to one another by means of sliding through dado joints with a right-angled tongue, which joints require additional U-shaped sealing elements enclosing the edges of the groove joint or sealing pins or tapes connecting the lower part of the groove to the edge of the panel to be slid into for watertight connection.

The international patent application WO 2007062690 A1 describes a wooden cask in the shape of a polyhedron for storing and aging beverages, which comprises a top, bottom, front, rear and two side panels assembled together to define an internal storage volume. The bottom panel can be tilted downwards from the rear edge toward the front edge.

On the outer sides of the two opposite side panels, a combined pair of vertical beams is arranged as supporting pillars in the shape of a hexagonal prism with rectangular bases and two trapezoidal walls perpendicular thereto, the ends of the vertical beams not extending over the lower or upper edge of the side panels. The rectangular base adjacent to the longer base of the trapezoidal side is at the same time proximal to the external face of the side panel, while the rectangular base adjacent to the shorter base of the trapezoidal side is at the same time distal to the external face of the side panel.

On the external face of the top and bottom panels, an associated pair of horizontal beams is arranged as supporting pillars in the shape of a hexagonal prism with rectangular bases and two trapezoidal walls perpendicular thereto, the ends of the horizontal beams not extending beyond the side edges of the top and bottom panels. The rectangular base adjacent to the shorter base of the trapezoidal side is at the same time proximal to the outer side of the top or the bottom panel, while the rectangular base adjacent to the longer base of the trapezoidal side is at the same time distal to the outer side of the top or bottom panel. In addition, the inclining side walls adjacent to the arms of the trapezoidal side are covered with a reinforcing metal layer.

Two oblique holes are drilled across each vertical beam for oblique fixing screws in a direction from the distal rectangular base to the proximal rectangular base extending substantially parallel to the arms of the trapezoidal sides so that one oblique hole faces through the hole in the side panel to the horizontal beam of the top panel and the other to horizontal beam of the bottom panel. The corresponding openings in the horizontal beams are located in the reinforcing metal layers on the inclining side walls. A total of four oblique fixing screws pass through these aligned holes, which are able to exert a pressing force with a tendency to press both side panels against the top or the bottom panel. The actual connection between the side panels with the top or the bottom panel is achieved by means of sliding through dado joints with a right-angled toothing (i.e. multiple tongues and grooves), which, however, require the use of these oblique fixing screws for sufficient watertightness.

The international patent application WO 2017081596 A1 describes a wooden cask in the shape of a polyhedron for storing and aging beverages, which comprises a top, bottom, front, rear and two side panels assembled together to define an internal storage volume.

The top panel is tilted upwards from the rear edge toward the front edge, and the bottom panel is tilted downwards from the rear edge toward the front edge. There is a fill hole in the front panel near the upper edge thereof and a drain hole in the front panel near the lower edge thereof, but not in contact with the inner side of the lower panel. Thus, there is a space between the drain hole and the internal face of the bottom panel from which not all the liquid can drain.

The wooden cask further comprises three associated pairs of vertical beams, each of which has two ends, and which form a buttress opposite the outer sides of the two opposite side panels. The two ends of each vertical beam extend beyond the lower and upper edges of the side panel opposite the vertical beam. Each vertical beam is connected to another vertical beam positioned opposite the external face of the opposite side panel, thus forming a pair of associated vertical beams.

The wooden cask further comprises two compression rods per one pair of associated vertical beams. Within this pair, each end of the vertical beam is connected to the other end of the vertical beam by a single compression rod capable of exerting a horizontal force with a tendency to bring together opposite vertical beams and opposite side panels on which the two vertical beams rest. Each end of the vertical beams is pierced with a horizontal through hole, and each side panel is pierced with a plurality of horizontal through holes, each being aligned with the adjacent horizontal through hole of the vertical beam, wherein the compression rods pass through the adjacent horizontal through holes. In addition, the compression rods do not pass above the top panel or below the bottom panel along their outer sides but pass through horizontal openings drilled across the top and bottom panels, thereby compromising their integrity and strength.

The joints between the side panel and the top panel, or between the side panel and the bottom panel are achieved by means of sliding through dado joints with a stepped tongue. The disadvantage of this joint is the presence of grooves outside the joint on both sides, where dirt, sludge, mould or moisture can settle, and at the same time the lack of self-sealing ability after soaking the wood with the stored liquid.

The joints between the front panel and the top and bottom panel, or between the rear panel and the top and bottom panels are achieved by means of sliding through dado joints with a right-angled or stepped tongue. A part of this joint is also the compression rod itself, which is placed in horizontal openings drilled along said joint so that in both connected panels there is an additional groove corresponding to the shape of the compression rod, e.g. with circular or double-sided dovetail cross-section. The disadvantage of guiding the compression rod inside the joint is the impairment of its integrity, watertightness and strength, while in addition there is a risk of deflection of the top or the bottom panel in the middle, which exacerbates the following disadvantages.

The disadvantage of the above-cited arrangements is the leakage of the joints of the casks with impaired integrity and the leakage of the stored liquid, or the penetration of air into the cask, which causes oxidation of the stored beverage.

Another disadvantage is the need to use other sealing agents, such as sealing fabrics or silicones, which increase the complexity of the production and impair the organoleptic properties of the stored beverage (e.g. in contact with silicone).

Another disadvantage of the above-cited arrangements is that the drain hole in the front panel near the lower edge thereof is not in contact with the internal face of the bottom panel, and thus there is a space between the drain hole and the internal face of the bottom panel from which not all liquid can drain. Such irrecoverable residue causes problems during cleaning the cask.

SUMMARY OF THE INVENTION

The object of the invention is to provide a wooden cask construction for storing and aging wine and other beverages which allows the sealing of used joints due to liquid soaking in the wood, complete draining of the interior space, space saving and good storability and stackability, easy assembly and disassembly, while preventing leaks, aeration of the interior space and the formation of mould.

This objective is achieved by a wooden cask comprising a top panel, a bottom panel, a front panel, a rear panel and two side panels, at least two associated pairs of vertical beams, at least two compression rods per an associated pair of vertical beams, at least one fill hole and at least one drain hole.

Each panel is provided with external and internal substantially planar faces and all are assembled together to a polyhedral shape so as to define an internal storage volume. The front panel, the rear panel and the two side panels define an upper edge and a lower edge, further the top panel and the bottom panel define a front edge and a rear edge, and the front panel and the rear panel define two side edges. The top panel is inclined upwards from the rear edge towards the front edge at an angle $\alpha$ and the bottom panel is inclined downwards from the rear edge towards the front edge at an angle $\beta$.

Each vertical beam is connected to another vertical beam bearing against the external face of an opposite side panel, forming thereby a pair of associated vertical beams forming a buttress against the external faces of the two opposite side panels. Each vertical beam has two ends, i.e. a lower end and an upper end, wherein the two ends of each vertical beam extend beyond the lower and upper edges of the side panel against which the vertical beam is mounted.

Each end of the vertical beam is connected to another end of the vertical beam of a pair of associated vertical beams by means of one compression rod able to exert a horizontal force tending to bring together the opposite vertical beams of a pair of associated vertical beams and the opposite side panels against which these two vertical beams rest. Each end of the vertical beams is pierced by a horizontal through hole and each side panel is pierced by a plurality of horizontal through holes, each horizontal through hole of the side panel being aligned with the neighbouring horizontal through hole of the vertical beam, so that the compression rods pass through the neighbouring horizontal through holes.

The fill hole is arranged in the top panel near the front edge thereof and the drain hole is arranged in the front panel near the lower edge thereof.

The invention essentially discloses that the compression rods pass at a distance above the surface of the top panel along the external face thereof (i.e. without contacting the surface of the external face of the top panel) or below the bottom panel in the vicinity of the lower edges of the front, rear and/or side panels (i.e. without contacting or with contact to the surface of the external face of the bottom panel or the lower edge of the front, rear and/or side panels). The position of the compression rods approximately copies the tilt of the top and bottom panels, wherein the compression rods near the front edge of both the top and bottom panels pass through the horizontal through holes closer to both ends of the vertical beams than the horizontal through holes through which compression tie bars pass near the rear edge of the top and bottom panels. The space between the compression bars and the surface of the external face of the top, or of the bottom panel respectively, is important to facilitate the drainage of any residues of stored beverage or moisture, which prevents the formation of mould and deposits on the surface of the external face of the top or the bottom panel. This prevents liquid from being trapped in the space of the compression rods.

The invention essentially further discloses that the joints between the top panel and the front and rear panels and between the bottom panel and front and rear panels are four half-blind sliding half dovetail joints and that the joints between the front panel and the side panels and between the rear panel and the side panels are four chamfered dado joints. The advantage of the half-blind sliding half dovetail joint according to the invention over other commonly used joints is its self-sealing ability after soaking the wood with the stored liquid and maintaining the joint even after drying the wooden cask, and also the advantage of the chamfered dado joint is its self-sealing ability after soaking the wood with stored liquid.

A preferred arrangement of the compression rod passing below the bottom panel near the lower edge of the front panel is in a groove extending along the entire length of the lower edge of the front panel. The remaining compression rods passing below the bottom panel are preferably arranged at a distance from the surface of the external face thereof.

Preferably, each compression rod comprises two threaded ends, wherein a fixation means, in particular a nut provided with a washer or a fixation screw, is screwed to each threaded end, which results in strengthening the structure and function of the vertical beams as buttresses. To place the fixation means, there is a milled area in the horizontal through hole of the vertical beam on the outer side thereof, which allows the fixation means to be hidden inside the vertical beam, and thus allows better storage of two wooden casks arranged closer next to each other.

In a preferred embodiment, each half-blind sliding half dovetail joint comprises a half dovetail-shaped tail and a correspondingly half dovetail-shaped socket, wherein the half dovetail portion of each tail is oriented towards the external face of the bottom, front and/or rear panels, i.e. away or outwards from the internal storage volume. This arrangement ensures the sealing of the joints after soaking the wood with the stored liquid.

For the purpose of distinguishing, the individual components of these four half-blind sliding half dovetail joints are designated by attributes first to fourth. The first half-blind sliding half dovetail joint comprises a first half dovetail-shaped socket arranged on the internal face near the front edge of the top panel and a first half dovetail-shaped tail arranged on the upper edge of the front panel. The second half-blind sliding half dovetail joint comprises a second half dovetail-shaped socket arranged on the internal face near the rear edge of the top panel and a second half dovetail-shaped tail arranged on the upper edge of the rear panel. The third half-blind sliding half dovetail joint comprises a third half dovetail-shaped socket arranged on the internal face near the lower edge of the front panel and a third half dovetail-shaped tail arranged on the front edge of the bottom panel. The fourth half-blind sliding half dovetail joint comprises a fourth half dovetail-shaped socket arranged on the internal face near the lower edge of the rear panel and a fourth half dovetail-shaped tail arranged on the rear edge of the bottom panel.

In a preferred embodiment, each chamfered dado joint comprises a chamfered tail and a correspondingly chamfered socket, wherein the chamfered portion of each chamfered tail is oriented towards the external face of the front and/or rear panels, i.e. away or outwards from the internal storage volume. The chamfered dado joint is either a continuous though joint along the entire side edge of the front and/or rear panel, or a stopped joint near the lower edge of the front and/or rear panel.

For the purpose of distinguishing, the individual components of these four chamfered dado joints are designated by attributes first to fourth. The first chamfered dado joint comprises a first chamfered socket arranged on the internal face near the front edge of one of the side panels and a first chamfered tail arranged on one of side edges of the front panel. The second chamfered dado joint comprises a second chamfered socket arranged on the internal face near the rear edge of one of the side panels and a second chamfered tail arranged on one of side edges of the rear panel. The third chamfered dado joint comprises a third chamfered socket arranged on the internal face near the front edge of the other of the side panels and a third chamfered tail arranged on the other of side edges of the front panel. The fourth chamfered dado joint comprises a fourth chamfered socket arranged on the internal face near the rear edge of the other of the side panels and a fourth chamfered tail arranged on the other of side edges of the rear panel.

In a preferred embodiment, the top panel is inclined at an angle $\alpha$ in the range of 90.5° to 135°, in particular in the range of 90.5° to 100°, preferably e.g. 90.5°, 91°, 92°, 93°, 94°, 95°, 96°, 97°, 98°, 99° or 100° with respect to the internal side of the rear panel. Analogously, bottom panel is inclined at an angle $\beta$ in the range of 90.5° to 135°, in particular in the range of 90.5° to 100°, preferably e.g. 90.5°, 91°, 92°, 93°, 94°, 95°, 96°, 97°, 98°, 99° or 100° with respect to the internal side of the rear panel. Particularly preferred values of the angles $\alpha$ and $\beta$ are in the range of 92° to 96°, e.g. 94°. The inclination of the top panel makes it possible to ensure the highest point in the internal storage volume near the fill hole, which enables to fully control the content of residual air after filling the wooden cask with liquid. By analogy, the inclination of the bottom panel makes it possible to ensure the lowest place in the internal storage volume near the drain hole, whereby the wooden cask can be fully emptied without undesired residues of the stored liquid.

In a preferred embodiment, the dovetail angle $\gamma$ of the half dovetail portion of each half dovetail-shaped tail with respect to the external face of the bottom, front and/or rear panels is in the range of 0.5° to 45°, in particular in the range of 5° to 25°, e.g. 5°, 6°, 7°, 8°, 9°, 10°, 11°, 12°, 13°, 14°, 15°, 16°, 17°, 18°, 19°, 20°, 21°, 22°, 23°, 24° or 25°. Particularly advantageous values of the angle $\gamma$ are in the range 12° to 16°, e.g. 14°.

In a preferred embodiment, the chamfer angle $\delta$ of the chamfered portion of each chamfered tail with respect to the side edge of the front and/or rear panels is in the range of 91° to 179°, in particular in the range of 110° to 140°, e.g. 110°, 111°, 112°, 113°, 114°, 115°, 116°, 117°, 118°, 119°, 120°, 121°, 122°, 123°, 124°, 125°, 126°, 127°, 128°, 129°, 130°, 131°, 132°, 133°, 134°, 135°, 136°, 137°, 138°, 139° or 140°. Particularly preferred values of the angle $\delta$ are in the range 124° to 128°, e.g. 126°.

In a preferred embodiment, the fill hole is adapted to receive a fill neck terminated with a blinded nut with a cover, wherein a reverse (inverted) cone is arranged inside the fill neck, e.g. hollow or filled and made of wood, cork, silicone or stainless steel. Thanks to the reverse cone, excess liquid and air can be expelled from the internal storage volume, thus preventing aerobic processes during aging and storage of the beverage (e.g. wine oxidation). For even better venting, a de-aeration indentation is arranged between the fill hole and the corner of the internal face of the top panel and the internal face of the front panel on the internal face of the top panel, through which excess air or liquid can escape through the fill hole from the area of the first half-blind sliding half dovetail joint. Excess liquid can then run down the inclined top panel without being blocked by the compression rods. The fill hole is parallel in its vertical axis to the front panel, and not perpendicular to the inclined top panel.

In a preferred embodiment, the drain hole is threaded and adapted to receive a threaded neck, preferably fixed to the external face of the front panel by means of a flange. A cylindrical groove provided with a thread and adapted to receive a threaded neck is arranged in the internal face of the bottom panel near the front edge thereof, wherein the lower edge of the inner radius (diameter) of the threaded neck is in contact with and forms an uninterrupted continuation of the internal face of the bottom panel. The lower edge of the inner radius of the threaded neck thus forms the lowest point in the internal storage volume, whereby the liquid content of the internal storage volume is completely drained, so that no residual beverage is trapped in the area of the third half-blind sliding half dovetail joint. The drain hole is arranged in parallel to the lower edge of the front panel, and not in parallel to the inclined bottom panel. The threaded neck can be fitted with a plug, valve or other extension from the outside.

In a preferred embodiment, the top end of the vertical beam is fitted with a tenon and the bottom end of the vertical beam is fitted with a mortise to connect two vertical beams along their vertical axes, which allows the casks to be stored and stacked on top of each other. The tenon and the mortise are of conical frustum shape (a truncated cone) due to a better manipulable connection compared to cylindrical tenons and mortises.

The properties of the individual joints are significantly affected by the arrangement of the direction of the wood fibres in the individual panels, wherein the preferred arrangement of the wood fibres is perpendicular to the compression rods in the top and bottom panels, perpendicular to the vertical beams in the side panels and parallel to the side edges of the front and rear panels. The wooden cask is most often made of oak (or other) wood cut radially, so that after soaking the wood with liquid, the joints are stretched and sealed.

The top panel, bottom panel, front panel, rear panel and two side panels are constructed as battenboards made of strips joined with a longitudinal multiple tongue and groove joint. This longitudinal joint is formed (milled) along the entire length of the strips. The strips of the top and bottom panels are oriented perpendicular to the compression bars, the strips of both side panels are oriented perpendicular to the vertical beams and the strips of the front and rear panels are oriented parallel to their side edges, i.e. in accordance with the orientation of the wood fibres in individual panels. The multiple tongues and grooves themselves are formed by several interlocking teeth and comprise only right-angled faces without bevelled or chamfered surfaces, which advantageously ensures the expansion and sealing of said joints after soaking the wood with the stored liquid. The disadvantage of the bevelled or chamfered surfaces in this joint is their divergence after the wood has soaked up and the occurrence of leaks.

The wooden cask is assembled as follows:

1. sliding the front and rear panels into the half dovetail-shaped grooves in the top panel;
2. sliding the bottom panel into the half dovetail-shaped grooves in the front and rear panels;
3. sliding the side panels onto the chamfered tails of the front and rear panels;
4. providing the wooden cask with the vertical beams and the compression bars and tightening of the fixation means; and
5. fitting the fill and drain holes with other elements (fill neck, threaded neck, blinded nuts, cover, reverse cone, or plug or valve).

The reusability of the wooden cask after the liquid has been discharged is ensured by the technology of deposit milling (e.g. tartar) and tanning the internal faces of the wooden casks, i.e. the surfaces that have come into contact with the stored liquid, by means of flame or infrared radiation. After this treatment, the thickness of the individual panels will be reduced when reused, and therefore it is advantageous to ensure an increase of the internal faces by approx. 1 to 6 mm (approx. 4 to 25%) during the first use of the wooden cask. This reuse is technologically demanding and unprofitable in the case of cylindrical barrels, and theoretically reduces the cost of producing one wooden cask (barrel) according to the invention by half.

BRIEF DESCRIPTION OF THE DRAWINGS

The essence of the invention is further illustrated on the basis of exemplary embodiments which are described with the aid of the accompanying drawings, where.

EXEMPLARY EMBODIMENTS OF THE INVENTION

These embodiments illustrate exemplary embodiments of the invention, which, however, have no limiting effect on the scope of protection.

Figure 1:
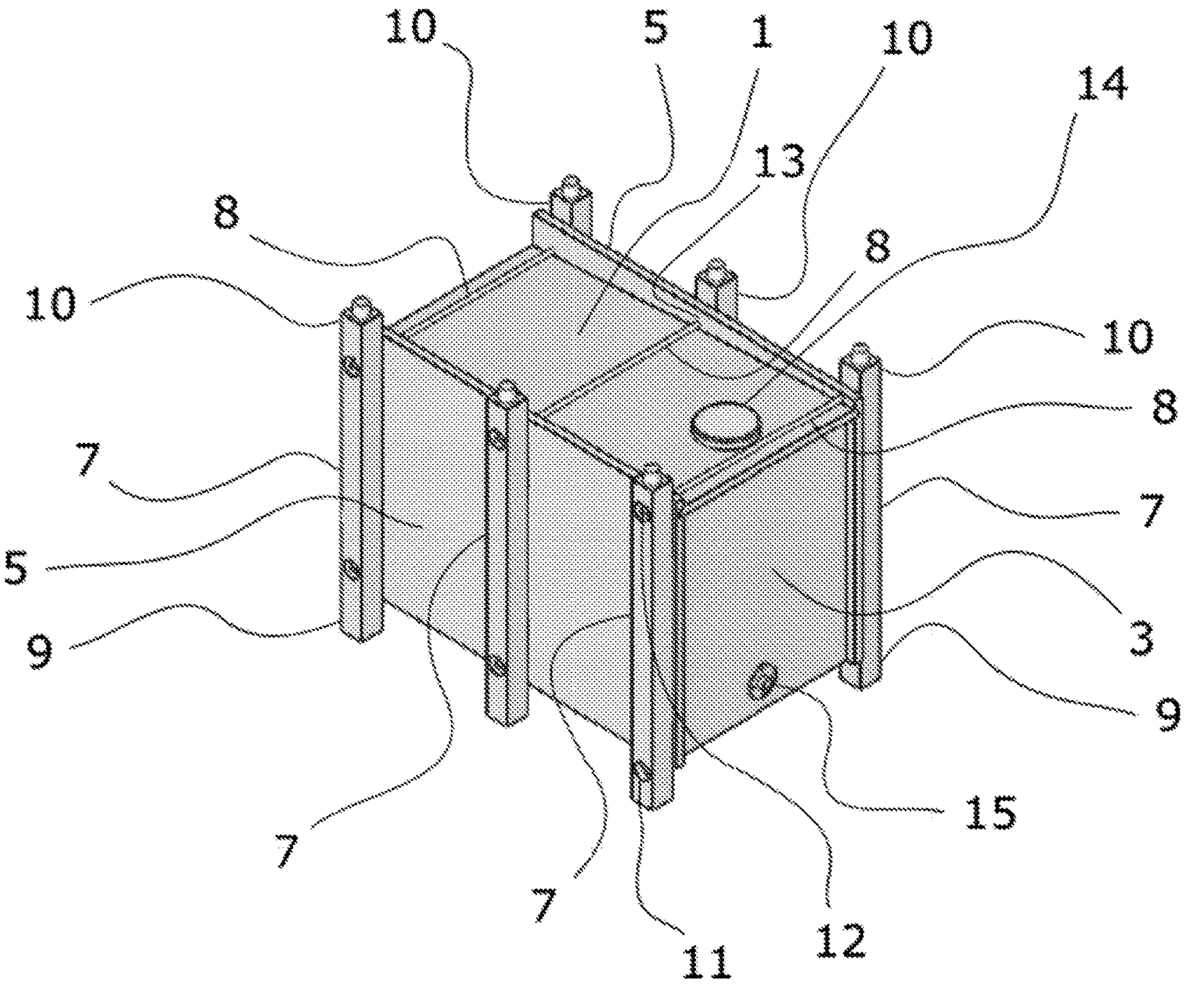
FIG. 1 shows a perspective view of the wooden cask according to the invention.

FIG. 1 shows a wooden cask in a perspective view that illustrates the front panel 3, the top panel 1 and the side panels 5, wherein the bottom panel 2 and the rear panel 4 are not visible in this view. The opposite side panels 5 are provided with three pairs of associated vertical beams 7 along the external faces thereof, which beams form buttresses or supporting pillars. Each vertical beam 7 has the bottom end 9 and the top end 10, wherein the two ends 9, 10 of each vertical beam 7 extend beyond the lower and upper edges of the side panel 5 against which the vertical beam 7 is mounted. Within one pair of associated vertical beams 7, the top and bottom ends 10, 9 are connected by a total of six compression bars 8 (three are shown) passing at a distance above the surface of the top panel 1 along the external face thereof and below the bottom panel 2 near the lower edges of the front, rear and/or side panels 3, 4, 5. Each compression rod 8 comprises two threaded ends to which a fixation means (e.g. a nut with a washer) located in the milled area 11 adjoining the horizontal through hole 12 of the vertical beam 7 is screwed. The top end 10 is provided with a tenon 18 and the bottom end 9 is provided with a mortise 19 (not shown) for connecting two vertical beams 7 in their vertical axes. In the top panel 1 near the front edge thereof, there is a fill hole 14 and in the front panel 3 near the lower edge thereof, there is a drain hole 15.

Figure 2:
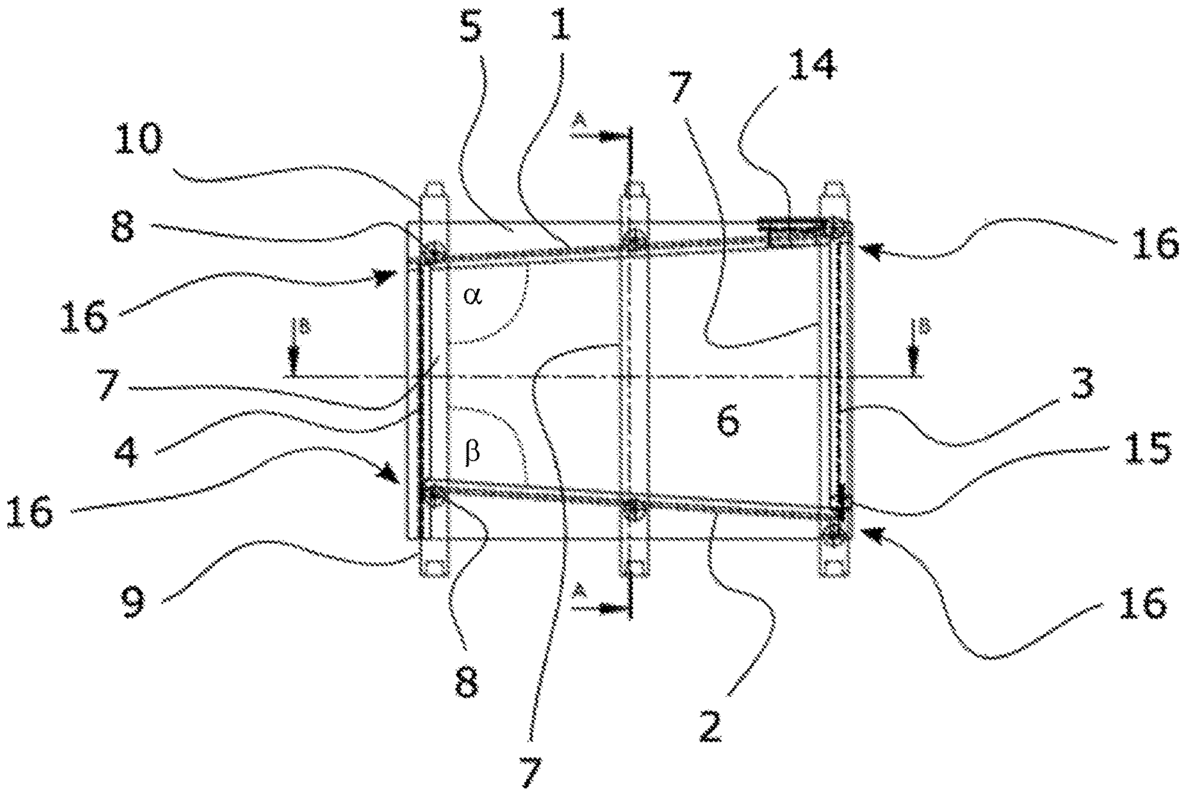
FIG. 2 shows a side view of the wooden cask according to the invention.

FIG. 2 shows a wooden cask in a side view from the outside of the side panel 5. The top panel 1 is connected to the front panel 3 and the rear panel 4 by means of two half-blind sliding half dovetail joints 16 and the front panel 3 and the rear panel 4 are further connected to the bottom panel 2 by means of two further half-blind sliding half dovetail joints 16, thus creating the internal storage volume 6. The top panel 1 is further inclined upwards from the rear edge towards the front edge at an angle α (e.g. in the range of 92° to 96°) and the bottom panel 2 is inclined downwards from the rear edge towards the front edge at an angle β (e.g. in the range of 92° to 96°). The compression rods 8 extend at a distance above the surface of the top panel 1 along the external face thereof (i.e. without contact to the surface of the external face of the top panel 1) or below the bottom panel 2 near the lower edges of the front, rear and/or side panels 3, 4, 5 (i.e. without or with contact to the surface of the external face of the bottom panel 2). The position of the compression rods 8 thus approximately copies the inclination of the top and bottom panels 1, 2. In the case of vertical beams 7, the tenons 18 at the top ends 10 and the mortises 19 at the bottom ends 9 are shown and the fill hole 14 and the drain hole 15 are also visible.

Figure 3:
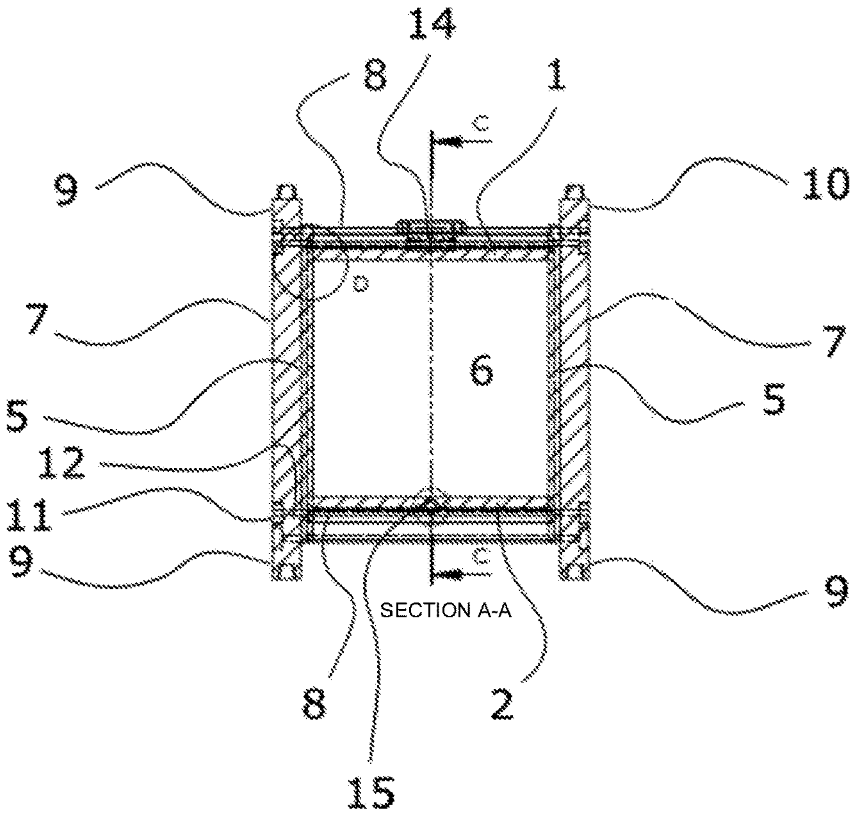
FIG. 3 shows a front view along the A-A section of FIG. 2 of the wooden cask according to the invention.

FIG. 3 shows a wooden cask in a front view along the AA section of FIG. 2, where the vertical beams 7 rest on the opposite side panels 5 and by means of the compression rods 8 passing via the horizontal through holes 12 and spaced above the surface of the top panel 1 along the external face thereof or below the bottom panel 2 near the lower edges of the front, rear and/or side panels 3, 4, 5, they exert a horizontal force tending to bring the opposite vertical beams 7 and the opposite side panels 5 together. In the front view, the fill and drain holes 14, 15 are shown in the middle of the top panel 1, or the front panel 3 respectively.

Figure 4:
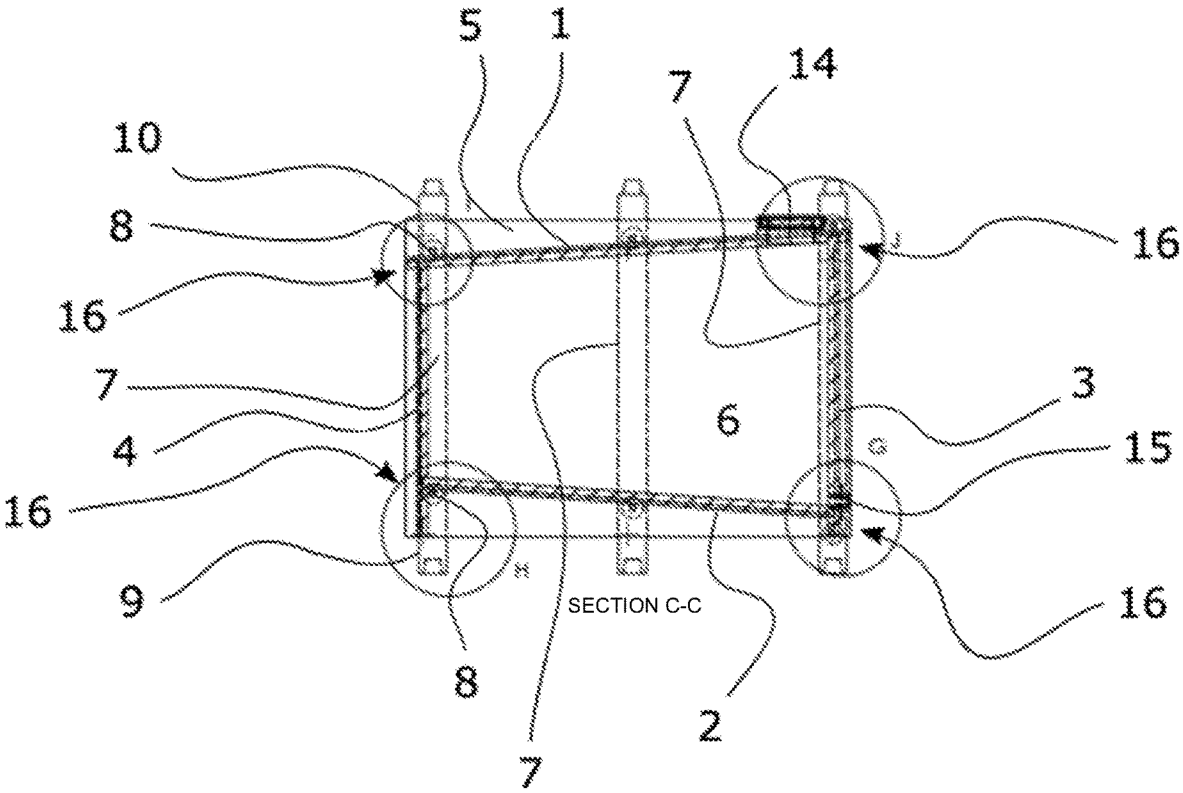
FIG. 4 shows a side view along the C-C section of FIG. 3 of the wooden cask according to the invention.

FIG. 4 shows a wooden cask in a side view along the C-C section of FIG. 3 and analogously to FIG. 2, wherein the individual half-blind sliding half dovetail joints 16 are indicated in more detail, see FIGS. 6 to 9 below.

Figure 5:
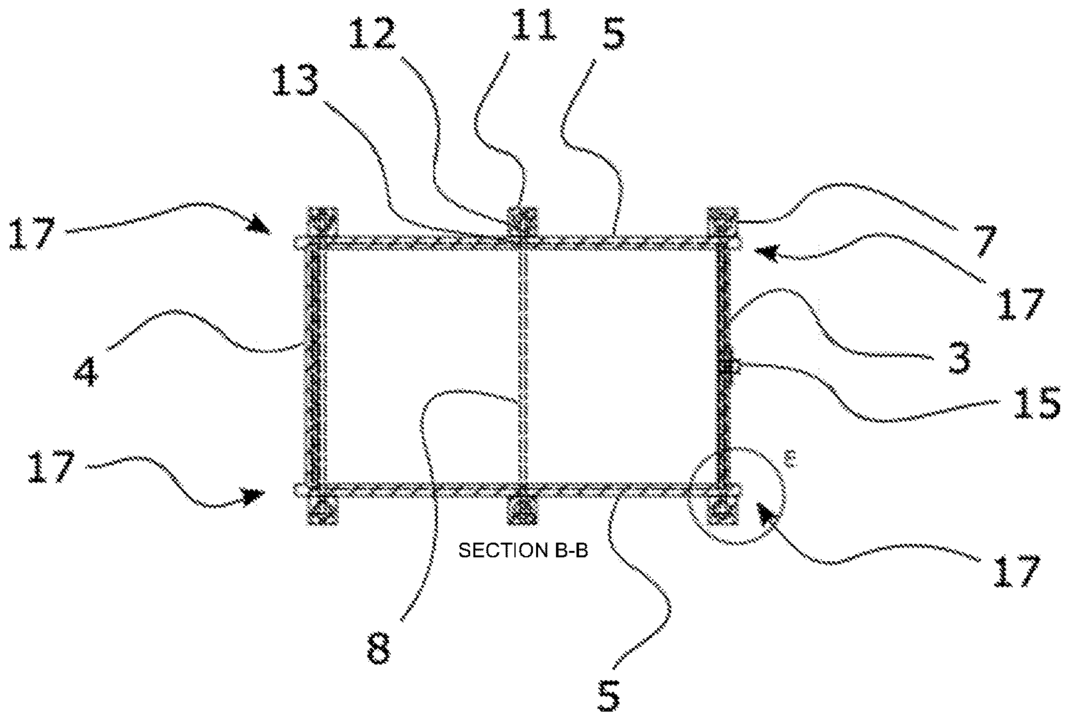
FIG. 5 shows a top view along the B-B section of FIG. 2 of the wooden cask according to the invention.

FIG. 5 shows a top view of the wooden cask along the B-B section of FIG. 2, where the vertical beams 7 rest on the opposite side panels 5 and exert a horizontal force by means of the compression rods 8 passing via the horizontal through holes 12 of vertical beams 7 and the horizontal through holes 13 of the side panels 5 which force tends to bring the opposite vertical beams 7 and the opposite side panels 5 together. The individual chamfered dado joints 17 are also indicated in more detail, see FIG. 10 below. In the top view, the drain hole 15 is shown in the middle of the front panel 3.

Figure 6:
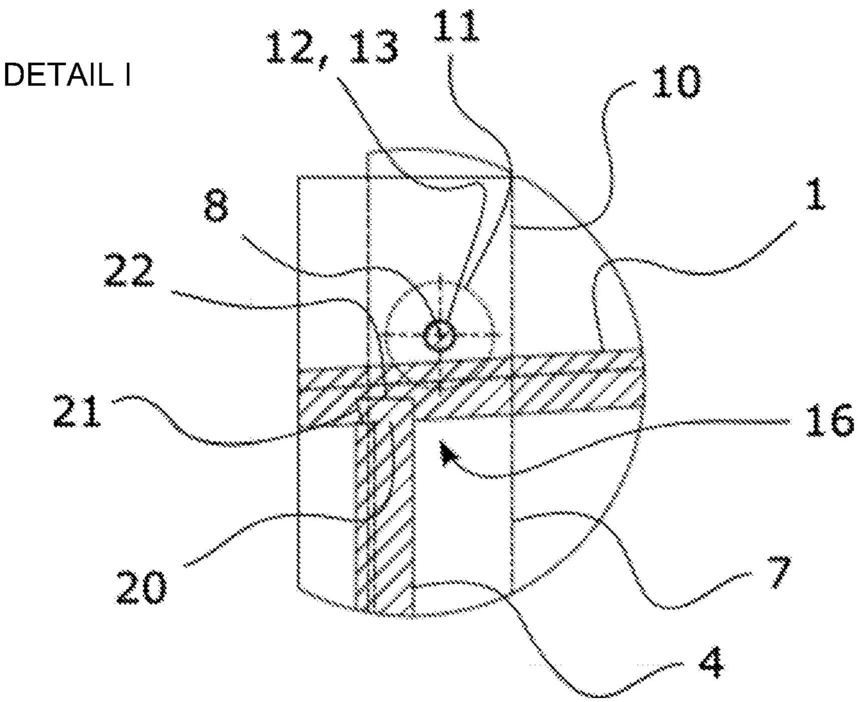
FIG. 6 shows a side view of detail I of FIG. 4 of the second half-blind sliding half dovetail joint between the rear and the top panels.

FIG. 6 shows a side view in detail I of FIG. 4 of the second half-blind sliding half dovetail joint 16 between the rear panel 4 and the top panel 1, wherein this joint 16 comprises the half dovetail-shaped tail 20 at the upper edge of the rear panel 4 and the corresponding half dovetail-shaped socket 22 on the internal face of the top panel 1 near the rear edge thereof. The half dovetail portion 21 of the tail 20 is oriented towards the external face of the rear panel 4, i.e. pointing away or outwards from the internal storage volume 6.

Figure 7:
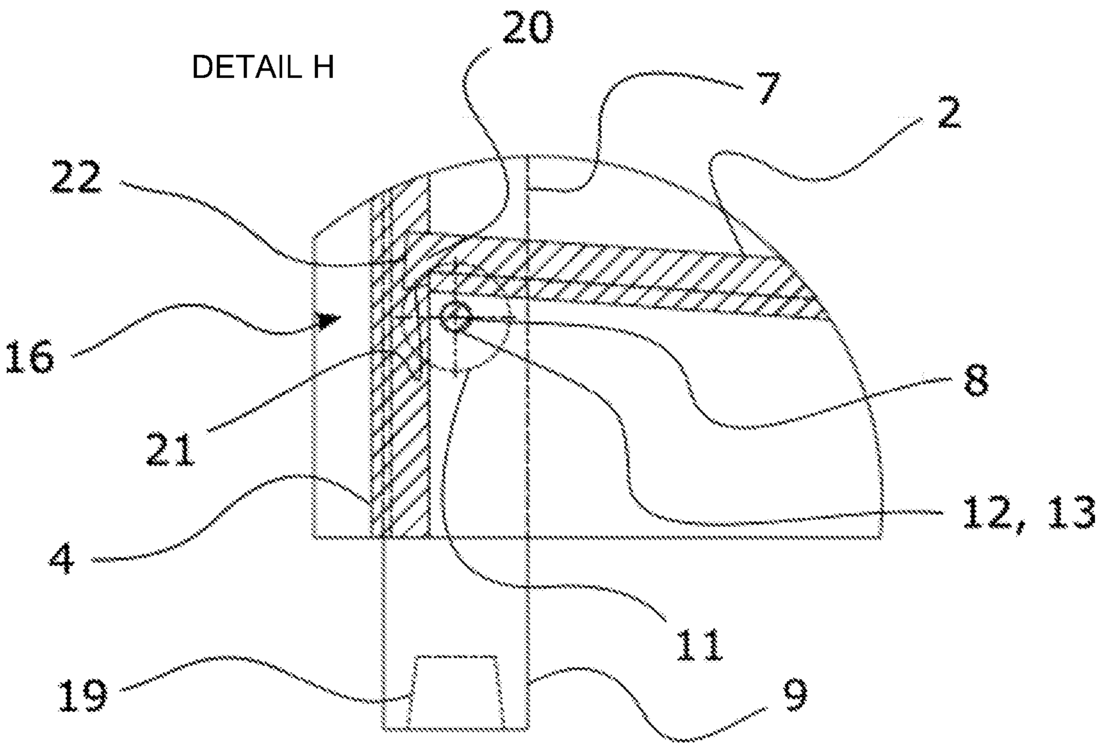
FIG. 7 shows a side view of detail H of FIG. 4 of the fourth half-blind sliding half dovetail joint between the rear and the bottom panels.

FIG. 7 shows a side view in detail H of FIG. 4 of the fourth half-blind sliding half dovetail joint 16 between the rear panel 4 and the bottom panel 2, wherein this joint 16 comprises the half dovetail-shaped tail 20 at the rear edge of the bottom panel 2 and the corresponding half dovetail-shaped socket 22 on the internal face of the rear panel 4 near the lower edge thereof. The half dovetail portion 21 of the tail 20 is oriented towards the external face of the bottom panel 2, i.e. pointing away or outwards from the internal storage volume 6.

Figure 8:
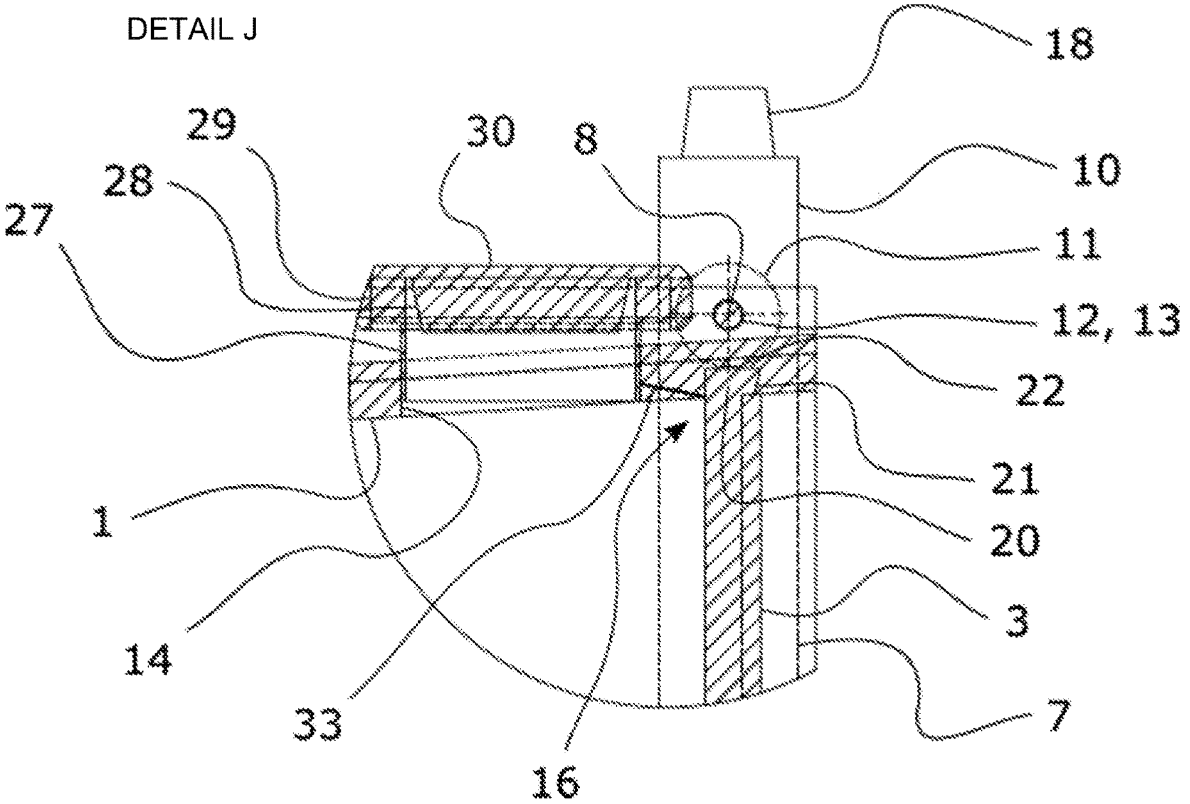
FIG. 8 shows a side view of detail J of FIG. 4 of the first half-blind sliding half dovetail joint between the front and the top panel and showing the fill hole.

FIG. 8 shows a side view in detail J of FIG. 4 of the first half-blind sliding half dovetail joint 16 between the front panel 3 and the top panel 1, wherein this joint 16 comprises the half dovetail-shaped tail 20 at the upper edge of the front panel 3 and the corresponding half dovetail-shaped socket 22 on the internal face of the top panel 1 near the front edge thereof. The half dovetail portion 21 of the tail 20 is oriented towards the external face of the front panel 3, i.e. pointing away or outwards from the internal storage volume 6. The fill hole 14 in the top panel 1 near the front edge thereof is further shown in more detail. The fill hole 14 is adapted to receive the fill neck 27 terminated by the blinded nut 29 with the cover 30, wherein the reverse (inverted) cone 28 is arranged inside the fill neck 27 for expelling excess liquid and air from the internal storage volume 6. The fill neck 27 can be secured by screws passing through the wall of the fill neck 27 into the top panel 1. The fill hole 14 is parallel in its vertical axis to the front panel 3, and not perpendicular to the inclined top panel 1. For even better venting, the de-aeration indentation 33 is arranged between the fill hole 14 and the corner of the internal face of the top panel 1 and the internal face of the front panel 3 on the internal face of the top panel 1, through which excess air or liquid can escape through the fill hole 14 from the area of the first half-blind sliding half dovetail joint 16.

Figure 9:
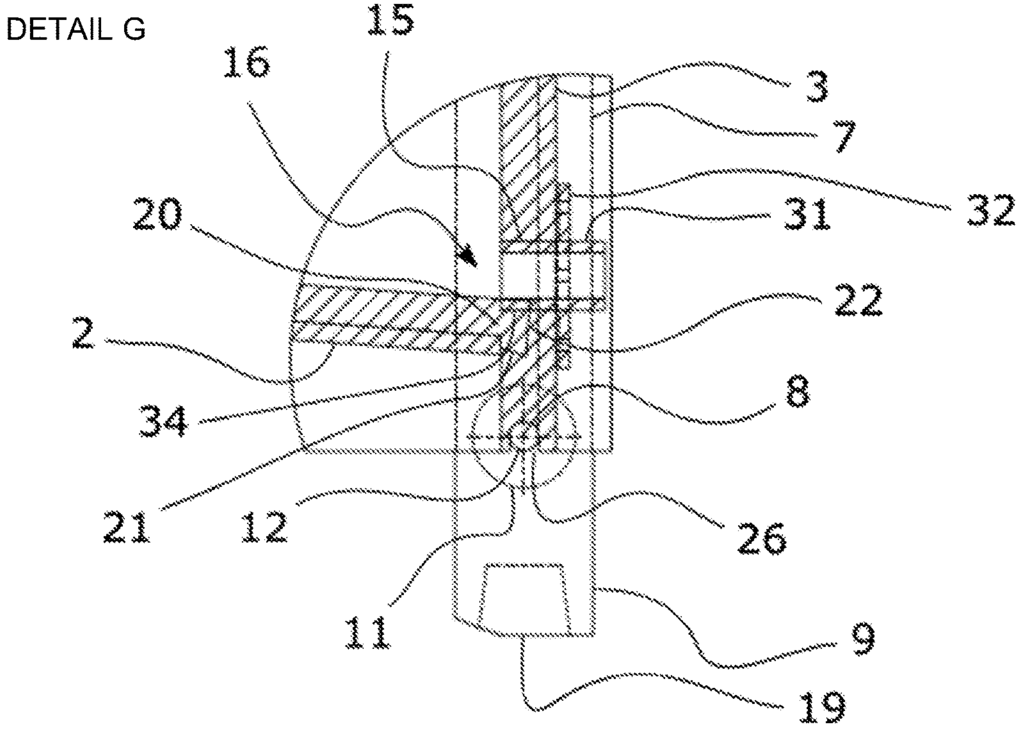
FIG. 9 shows a side view of detail G of FIG. 4 of the third half-blind sliding half dovetail joint between the front and the bottom panel and showing the drain hole.

FIG. 9 shows a side view in detail G of FIG. 4 of the third half-blind sliding half dovetail joint 16 between the front panel 3 and the bottom panel 2, wherein this joint 16 comprises the half dovetail-shaped tail 20 at the front edge of the bottom panel 2 and the corresponding half dovetail-shaped socket 22 on the internal face of the front panel 3 near the lower edge thereof. The half dovetail portion 21 of the tail 20 is oriented towards the external face of the bottom panel 2, i.e. pointing away or outwards from the internal storage volume 6. Also, the groove 26 for the compression rod 8 is shown in the lower edge of the front panel 3, through which groove passes the compression rod 8 below the bottom panel 2 near the lower edge of the front panel 3. The drain hole 15 in the front panel 3 near the lower edge thereof is further shown in more detail. The drain hole 15 is threaded and is adapted to receive the threaded neck 31 that can be fastened by the flange 32 on the external face of the front panel 3. In the internal face of the bottom panel 2 near the front edge thereof, the threaded cylindrical groove 34 is arranged and adapted to receive the threaded neck 31, wherein the lower edge of the inner radius (diameter) of the threaded neck 31 contacts and seamlessly adjoins the internal face of the bottom panel 2. The drain hole 15 is arranged in parallel to the lower edge of the front panel 3, and not in parallel to the inclined bottom panel 2.

Figure 10:
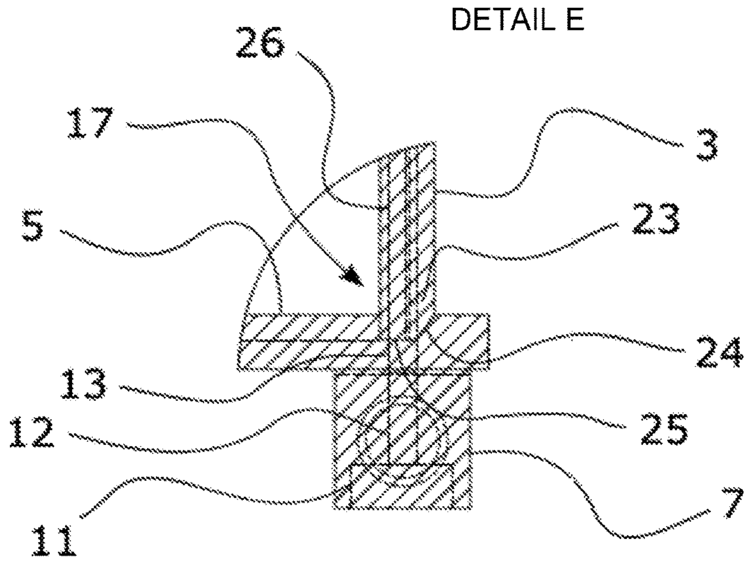
FIG. 10 shows a top view of detail E of FIG. 5 of the first chamfered dado joint between the front and the side panel.

FIG. 10 shows a top view in detail E of FIG. 5 of the first chamfered dado joint 17 between the front panel 3 and the side panel 5, wherein this joint 17 comprises the chamfered tail 23 and the corresponding chamfered socket 25. The chamfered portion 24 of the tail 23 is oriented towards the external face of the front panel 3, i.e. pointing away or outwards from the internal storage volume 6. Further to be seen is the alignment of the groove 26 for the pulling rod 8, the horizontal through hole 13 of the side panel 5 and the horizontal through hole 12 of the vertical beam 7 together with the milled area 11 for locating the fixation means for the pulling rod 8.

Figure 11:
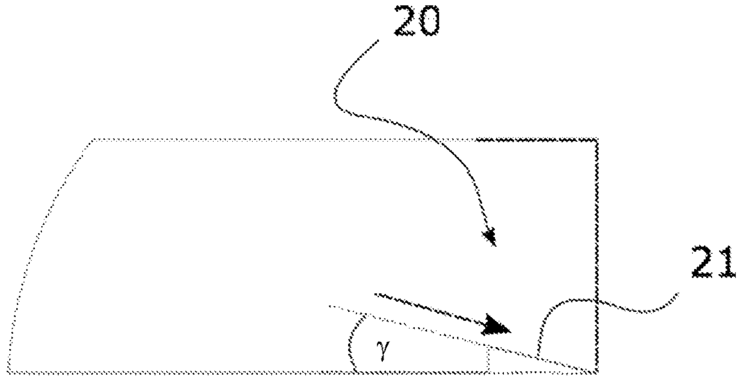
FIG. 11 shows a side view of the half dovetail-shaped tail with a marked dovetail angle $\gamma$ of the half dovetail portion of the tail.

FIG. 11 shows a side view of the half dovetail-shaped tail 20 with a marked dovetail angle γ of the half-dovetail portion 21 of this tail 20 (e.g. in the range of 12° to 16°). The self-sealing ability of the half dovetail joint 16 is due to the fact that after soaking the wood with the stored liquid, the half dovetail-shaped tail 20 expands and moves slightly along the inclined surface of the half-dovetail portion 21 towards the half dovetail-shaped socket 22 (see arrow in FIG. 11). Thus, the sealing itself occurs on the right-angled surfaces of the half dovetail-shaped tail 20, which are opposite to the surface of the half-dovetail portion 21 and are highlighted by a broken line. In comparison, the above-mentioned sealing of both right-angled surfaces of the half dovetail-shaped tail 20 oriented towards the internal face of the internal storage volume 6 cannot be achieved with other half-blind T-shaped joints (e.g. a full dovetail joint, a right-angled groove joint, a right-angled or a bevelled dado joint, a tongue and groove joint or a joint reinforced with biscuits etc.).

Figure 12:
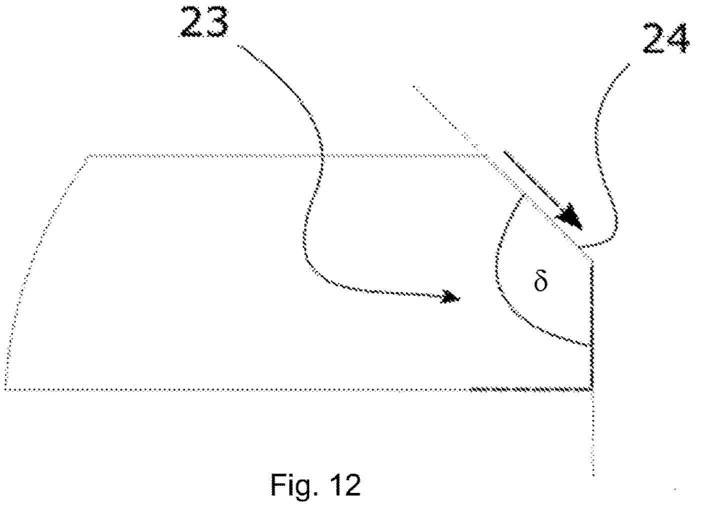
FIG. 12 shows a top view of the chamfered tail with a marked chamfered angle $\delta$ of the chamfered portion of the tail.

Analogously, FIG. 12 shows a top view of the chamfered tail 23 with a marked chamfer angle δ of the chamfered portion 24 of the tail 23 (e.g. in the range 124° to 128°). The self-sealing ability of the chamfered dado joint 17 is due to the fact that after the wood has been soaked with the stored liquid, the chamfered tail 23 expands and moves slightly along the inclined surface of the chamfered portion 24 towards the chamfered socket 25 (see arrow in FIG. 12). Thus, the sealing itself occurs on the right-angled surfaces of the chamfered tail 23, which are opposite to the surface of the chamfered portion 24 and are highlighted by a broken line. In comparison, the above-mentioned sealing of both right-angled surfaces of the chamfered tail 23 oriented towards the internal face of the internal storage volume 6 cannot be achieved with other T-shaped grooved joints (e.g. a right-angled dado joint or a bevelled dado joint without right angles etc.). Compared to full dovetail or half dovetail joints, the chamfered dado joint 17 can be easily disassembled after removing the compression rods 8 and the vertical beams 7, whereby the side panels 5 can be easily disassembled for cleaning and reuse.

Figure 13:
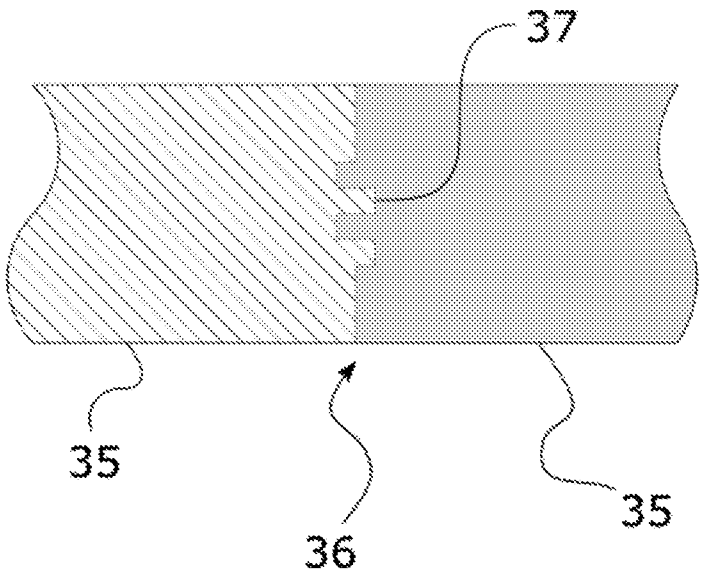
FIG. 13 shows a side view of the longitudinal multiple tongue and groove joint for joining of the strips in the battenboard construction.

FIG. 13 shows the construction of the battenboard made of the strips 35 joined with a longitudinal multiple tongue and groove 37 joint 36. This battenboard is used in all panels 1, 2, 3, 4 and 5. This longitudinal joint 36 is formed (milled) along the entire length of the strips 35. The multiple tongues and grooves 37 themselves are formed by several interlocking teeth and comprise only right-angled faces without bevelled or chamfered surfaces, which advantageously ensures the expansion and sealing of said joint after soaking the wood with the stored liquid.

INDUSTRIAL APPLICABILITY

The wooden cask according to the invention can be used for storing and aging wine and spirits. After disposal, the wooden cask can be disassembled, and the individual wooden parts used in furniture industry or for parquet production.

LIST OF REFERENCE SIGNS

- 1 top panel
- 2 bottom panel
- 3 front panel
- 4 rear panel
- 5 side panel
- 6 internal storage volume
- 7 vertical beam
- 8 compression rod
- 9 lower end of the vertical beam 7
- 10 upper end of the vertical beam 7
- 11 milled area
- 12 horizontal through hole of the vertical beam 7
- 13 horizontal through hole of the side panel 5
- 14 fill hole
- 15 drain hole
- 16 half-blind sliding half dovetail joint
- 17 chamfered dado joint
- 18 tenon
- 19 mortise
- 20 half dovetail-shaped tail
- 21 half dovetail portion of the tail 20
- 22 half dovetail-shaped socket
- 23 chamfered tail
- 24 chamfered portion of the tail 23
- 25 chamfered socket
- 26 groove for the compression rod 8
- 27 fill neck of the fill hole 14
- 28 blinded nut of the fill hole 14
- 29 reverse cone of the fill hole 14
- 30 cover of the fill hole 14
- 31 threaded neck of the drain hole 15
- 32 flange of the drain hole 15
- 33 de-aeration indentation
- 34 cylindrical groove
- 35 strip
- 36 tongue and groove joint
- 37 tongues and grooves
- α inclination angle of the top panel 1
- β inclination angle of the bottom panel 2
- γ dovetail angle of the half dovetail portion 21
- δ chamfer angle of the chamfered portion 24

The invention claimed is:

1. A wooden cask for storing and aging wine and other beverages, comprising:

a top panel, a bottom panel, a front panel, a rear panel and two side panels, each comprising external and internal substantially planar faces and assembled together so as to define an internal storage volume, wherein the front panel, the rear panel and the two side panels define an upper edge and a lower edge, wherein the top panel and the bottom panel define a front edge and a rear edge, wherein the front panel and the rear panel define two side edges, and wherein the top panel is inclined upwards from the rear edge towards the front edge and the bottom panel is inclined downwards from the rear edge towards the front edge;

at least two associated pairs of vertical beams, wherein each vertical beam has two ends and forms a buttress against the external faces of the two opposite side panels, and wherein each vertical beam is connected to another vertical beam bearing against the external face of an opposite side panel to form a pair of associated vertical beams;

at least two compression rods per an associated pair of vertical beams, wherein each end of the vertical beam is connected to another end of the vertical beam of a pair of associated vertical beams via a compression rod able to exert a horizontal force tending to bring together the opposite vertical beams of two associated vertical beams and the opposite side panels against which these two vertical beams rest, wherein each end of the vertical beams is pierced by a horizontal through hole and each side panel is pierced by a plurality of horizontal through holes, wherein each horizontal through hole of the side panel is aligned with the neighboring horizontal through hole of the vertical beam, and wherein the compression rods pass through the neighboring horizontal through holes; and at least one fill hole in the top panel near the front edge thereof and at least one drain hole in the front panel near the lower edge thereof, wherein the two ends of each vertical beam extend beyond the lower and upper edges of the side panel against which the vertical beam is mounted, wherein the compression rods pass at a distance above the surface of the top panel along the external face thereof or below the bottom panel in the vicinity of the lower edges of the front, rear, and/or side panels, wherein the joints between the top panel and the front and rear panels and between the bottom panel and front and rear panels comprise half-blind sliding half dovetail joints, and wherein the joints between the front panel and the side panels and between the rear panel and the side panels comprise chamfered dado joints, wherein a de-aeration indentation is arranged in the internal face of the top panel between the fill hole and a corner of the internal faces of the top and front panels.

2. The wooden cask of claim 1 wherein the compression rod passing below the bottom panel in the vicinity of the lower edge of the front panel is inserted in a groove extending along the lower edge of the front panels.

3. The wooden cask of claim 1 wherein each compression rod comprises two threaded ends, and wherein a fixation means comprising a nut or a fixation screw is screwed to each threaded end.

4. The wooden cask of claim 3 wherein the horizontal through hole of the vertical beam comprises a milled area to accommodate the fixation means.

5. The wooden cask of claim 1 wherein each half-blind sliding half dovetail joint comprises a half dovetail-shaped tail and a corresponding half dovetail-shaped socket, and wherein the half dovetail portion of each tail is oriented towards the external face of the bottom, front, and/or rear panels.

6. The wooden cask of claim 1 wherein the half-blind sliding half dovetail joints comprise:

a first half-blind sliding half dovetail joint comprising a first half dovetail-shaped socket arranged on the internal face near the front edge of the top panel and a first half dovetail-shaped tail arranged on the upper edge of the front panel;

a second half-blind sliding half dovetail joint comprising a second half dovetail-shaped socket arranged on the internal face near the rear edge of the top panel and a second half dovetail shaped tail arranged on the upper edge of the rear panel;

a third half-blind sliding half dovetail joint comprising a third half dovetail-shaped socket y arranged on the internal face near the lower edge of the front panel and a third half dovetail shaped tail arranged on the front edge of the bottom panel; and a fourth half-blind sliding half dovetail joint comprising a fourth half dovetail-shaped socket arranged on the internal face near the lower edge of the rear panel and a fourth half dovetail shaped tail arranged on the rear edge of the bottom panel.

7. The wooden cask of claim 1 wherein:

each chamfered dado joint comprises a chamfered tail and a corresponding chamfered socket; the chamfered portion of each chamfered tail is oriented towards the external face of the front and/or rear panels; and each chamfered dado joint comprises:

a through joint along the entire side edge of the front and/or rear panel; or a stopped joint near the lower edge of the front and/or rear panel.

8. The wooden cask of claim 1 wherein the chamfered dado joints comprise:

a first chamfered dado joint comprising a first chamfered socket arranged on the internal face near the front edge of one of the side panels and a first chamfered tail arranged on one of side edges of the front panel;

a second chamfered dado joint comprising a second chamfered socket arranged on the internal face near the rear edge of one of the side panels and a second chamfered tail arranged on one of side edges of the rear panel;

a third chamfered dado joint comprising a third chamfered socket arranged on the internal face near the front edge of the other of the side panels and a third chamfered tail arranged on the other of side edges of the front panel; and a fourth chamfered dado joint comprising a fourth chamfered socket arranged on the internal face near the rear edge of the other of the side panels and a fourth chamfered tail arranged on the other of side edges of the rear panel.

9. The wooden cask of claim 1 wherein the top panel is inclined at an angle $\alpha$ in the range of 90.5° to 135° with respect to the internal side of the rear panel, and wherein the bottom panel is inclined at an angle $\beta$ in the range of 90.5° to 135° with respect to the internal side of the rear panel.

10. The wooden cask of claim 1 wherein the top panel is inclined at an angle $\alpha$ in the range of 90.5° to 100° with respect to the internal side of the rear panel, and wherein the bottom panel is inclined at an angle $\beta$ in the range of 90.5° to 100° with respect to the internal side of the rear panel.

11. The wooden cask of claim 1 wherein the dovetail angle $\gamma$ of the half dovetail portion of each tail with respect to the external face of the bottom, front, and/or rear panels is in the range of 0.5° to 45°.

12. The wooden cask of claim 1 wherein the dovetail angle $\gamma$ of the half dovetail portion of each tail with respect to the external face of the bottom, front, and/or rear panels is in the range of 5° to 25°.

13. The wooden cask of claim 1 wherein the chamfer angle δ of the chamfered portion of each tail with respect to the side edge of the front and/or rear panels is in the range of 91° to 179°.

14. The wooden cask of claim 1 wherein the chamfer angle δ of the chamfered portion of each tail with respect to the side edge of the front and/or rear panels is in the range of 110° to 140°.

15. The wooden cask of claim 1 wherein:
the fill hole is adapted to receive a fill neck terminated with a blinded nut with a cover; a reverse cone is arranged inside the fill neck; and
the vertical axis of the fill hole is in parallel to the front panel.

16. The wooden cask of claim 1 wherein:
the drain hole is threaded and adapted to receive a threaded neck fastenable to the external face of the front panel by means of a flange;
a threaded cylindrical groove is arranged in the internal face of the bottom panel near the front edge thereof and adapted to receive the threaded neck;
the lower edge of an inner radius of the threaded neck is in contact with and forms an uninterrupted continuation of the internal face of the bottom panel; and
the drain hole is arranged in parallel to the lower edge of the front panel.

17. The wooden cask of claim 1 wherein:
a top end of the vertical beam is fitted with a tenon;
a bottom end of the vertical beam is fitted with a mortise to connect two of the vertical beams along their vertical axes; and
the tenon and the mortise are of conical frustum shape.

18. The wooden cask of claim 1 wherein:
the top panel, the bottom panel, the front panel, the rear panel, and the two side panels are constructed as battenboards made of strips joined with a longitudinal multiple tongue and groove joint;
the strips of the top and bottom panels are oriented perpendicular to the compression rods;
the strips of the two side panels are oriented perpendicular to the vertical beams;
the strips of the front and rear panels are oriented parallel to the side edges thereof; and
the multiple tongues and grooves comprise right-angled faces.

* * * * *